PPCS TOLL TICKETING SYSTEM

Filed April 29, 1963

2 Sheets-Sheet 1

INVENTOR.
J. M. BLACKHALL
BY
Phillip A. Weiss
ATTORNEY

United States Patent Office 3,261,917

Patented July 19, 1966

3,261,917
PPCS TOLL TICKETING SYSTEM

James Mowat Blackhall, Chicago, Ill., assignor to International Telephone and Telegraph Corporation Filed Apr. 29, 1963, Ser. No. 276,350
9 Claims. (Cl. 179—8)

This invention relates to automatic toll ticketing systems and more particularly to systems for ticketing person-to-person, collect, and special service (PPCS) calls.

Originally, all telephone calls were completed on a manual basis. That is, an operator responded to a calling signal, learned the identity of a called subscriber, and used plug-and-jerk connectors to interconnect the calling and called stations. Unfortunately, however, this manual operation is comparatively slow and cumbersome. Moreover, it severely limits the growth of communication facilities, and consequently, the economic growth of the country. For example, a recent survey indicates that if every woman in the United States were a manual telephone operator, their combined efforts would not be adequate to complete the telephone calls in the United States.

The telephone was hardly invented before a trend began to transfer the work of establishing calls from the operators to the subscribers. In the beginning, the subscriber learned to push buttons and turn cranks to operate a few switches and gadgets. Then he learned to manipulate a dial and thereby operate large, complex, switching systems. More recently, he learned to complete toll calls by following established dialing procedures. For example, he has learned to dial a three digit area code, a seven digit called number, and sometimes a calling line or party identifying number which may also include as many as seven digits. Responsive thereto, automatic ticketing equipment prints a bill or makes other suitable records to charge the calling party for the call.

The services of operators are still required for PPCS calls. To make a manual PPCS call, a calling party calls an operator who places the call, challenges a called party, and makes a toll ticket if the called party accepts the call. When automatic toll ticketing equipment is used during a PPCS call, that equipment switches the calling subscriber to the operator who then supervises the call, as before. This is necessary because no manipulation of a dial will prove that a particular called person has, in fact, answered a person-to-person call. Nor will it prove that a called person will accept charges. Thus, as a generality, there has been no practical way to eliminate PPCS operators.

The minimum PPCS services that should be provided is to have the operator connected into the circuit at the initiation of the call. The operator receives identification information from the calling subscriber, challenges the called subscriber and starts the ticketer timing when the calling subscriber accepts the call. The operator disconnects after the call is accepted. In prior art systems, expensive register equipment was retained in the connection until the operator disconnected. This, of course, necessitated more registers adding additional overhead and equipment expenses to the high cost of providing for PPCS calls.

Accordingly, an object of this invention is to provide new and improved, economical, automatic toll ticketing systems. In particular, an object is to provide direct operator-ticketer connections during the normal register holding time, thus allowing the registers to release sooner and thereby reduce the number of expensive registers required in any given system. In this connection, an object is to give an operator access to the ticketer over either of two optional paths, one path serving to by-pass the registers so that they may be released sooner.

A related object of this invention is to provide a toll ticketing system offering either a maximum or minimum PPCS service. Here an object is to give the user a means for making a selection over whether the grade of service offered at any given time is maximum or minimum.

In accordance with one aspect of this invention, an automatic PPCS toll ticketing system is provided that offers either minimum or maximum service. When the calling party dials a special digit indicative of a PPCS call, a special selector switch is directed to a predetermined level. At this level, the calling subscriber station and forwarding connections are linked to the operator through the ticketer and its associated register sender. An alternate path from the operator to the ticketer is established to allow the register to drop out immediately after its function is completed when the call is established in the minimum service arrangement. If maximum service is given, the register is held until released by the operator.

The above mentioned and other objects of this invention together with the manner of obtaining them will become more apparent and the invention itself will be best understood by making reference to the following description of an exemplary embodiment of the invention taken in conjunction with the accompanying drawings wherein:

FIG. 1 shows in block diagram form an automatic toll ticketing system wherein the operator is connected to the ticketer by means of an automatic switching stage that by-passes the register-sender; and FIG. 2 shows in schematic circuit diagram form the portions of the automatic toll ticketing system of FIG. 1 that incorporate the principles of the invention.

*General description*

To place a PPCS call, a calling subscriber first consults a directory and learns of a prefix or access code which identifies the type of service that he desires. Then, he dials the prefix code and gains access to a PPCS operator. By naming the called party or answering the questions asked by the operator, he provides all necessary billing information. After the operator determines that the proper called party has answered, or takes other action to determine that the charges for a call will be accepted she starts billing and allows the call to proceed.

For a showing of the described system, reference is made to FIG. 1 which shows a telephone system 30 including a local switch train 31, an automatic toll ticketing system 32 and an operator position 33. For a more detailed explanation of the automatic toll ticketing system 32 reference is made to a co-pending U.S. patent application entitled "Automatic Toll Ticketing System," Serial Number 51,742, filed on August 24, 1960, now Patent Number 3,200,200, by J. M. Blackhall and assigned to the assignee of this invention. The particular showing of FIG. 1 is illustrated as used with a step-by-step switching system. It should be understood, however, that the invention is not limited to such an arrangement but would work equally well with such other arrangements, such as those using crossbar switches.

The switch train 31 includes an exemplary line finder 35, selector 36 and connector 37. Briefly, if a calling subscriber station A goes off hook, an associated line circuit 40 signals an allotter 41 to indicate a need for service. Responsive thereto, the finder 35 hunts for the calling line. Thereafter, the calling subscriber receives dial tone and subsequently operates a dial. Responsive to the digit pulses initiated by the dial, selector 36 is driven into a coupling with a connector, such as connector 37, to seize line circuit 42 associated with a local called subscriber B.

To seize the toll ticket system 32, it is only necessary to dial a special digit such as "9" in the exemplary system.

This special digit gives the calling subscriber access to a special second selector 45.

The second selector 45 is used to connect the calling subscriber station to special service equipment. For example, as shown in the exemplary system, a digit "1" sends the special selector 45 to a PPCS terminal on the automatic toll ticketing system 32. A digit "2" sends the special selector to a reverting call terminal whereby a reverting call circuit (not shown) is connected to the calling subscriber. In a similar manner, other special service circuits such as dial assist, information, etc. are connected to the calling subscriber's circuit responsive to the digit dialed.

The second selector 45 connects the calling subscriber station to the PPCS terminal of the automatic toll ticketing system 32. Route repeater 51, ticketer 52 and as associated register-sender 53 are included in automatic toll ticketing system 32. Normally, a printer or perforator and a clock calendar are also connected to the ticketer.

In operation, the pulses are relayed through the route repeater 51 and the ticketer 52 to the register-sender 53 that is pre-associated with the ticketer through switch 54. The register-sender 53 translates the digit pulses and transmits the translated digit pulses through route repeater 51 to control a route selector 55 that connects the calling subscriber station through the direct distance dialing network.

Responsive to the seizure of the PPCS terminal by selector 45, the ticketer 52 is connected to an operator's position 33 through register-sender 53, switch 57, and operator's trunk 56. This may be accomplished in any manner well known to those skilled in the art, such as by transmitting a PPCS call indicating signal such as a solid ground signal through the tip lead from the route repeater to the register-sender 53. Responsive to the ground signal, switch 57 is actuated to search for an idle operator's trunk such as trunk 56.

Means are provided for by-passing the register-sender 53 and connecting the operator's trunk directly to the ticketer. In greater detail, after the operator's trunk is seized, switch 58 is actuated to connect the operator's trunk directly to the ticketer. That is, when the operator's trunk 56 is seized, it sends a test signal back through register-sender 53. This signal is transmitted through switch 54 to a terminal of switch 58 and will cause the switch 58 to line up with switch 54 and connect the operator position to the particular ticketer that is in the circuit, in this case, ticketer 52. Switch 58 is actuated and hunts until it locates this test signal at which time it terminates its hunting operation. A by-path circuit around the register-sender is thus established. This connection enables the register-sender to be dropped, in the minimum service arrangement, immediately after it completes its outpulsing. In the past, it was necessary to keep the expensive register-sender connected to the ticketer until the desired called party was on the phone and the call was accepted and actually initiated. By this use of switch 58 to bridge the register-sender, it is now possible to release the register-sender for further service—in connection with other calls—even before the called phone is answered. Thus, fewer register-senders can now effectively service more customers.

*Detailed description*

Figure 2:
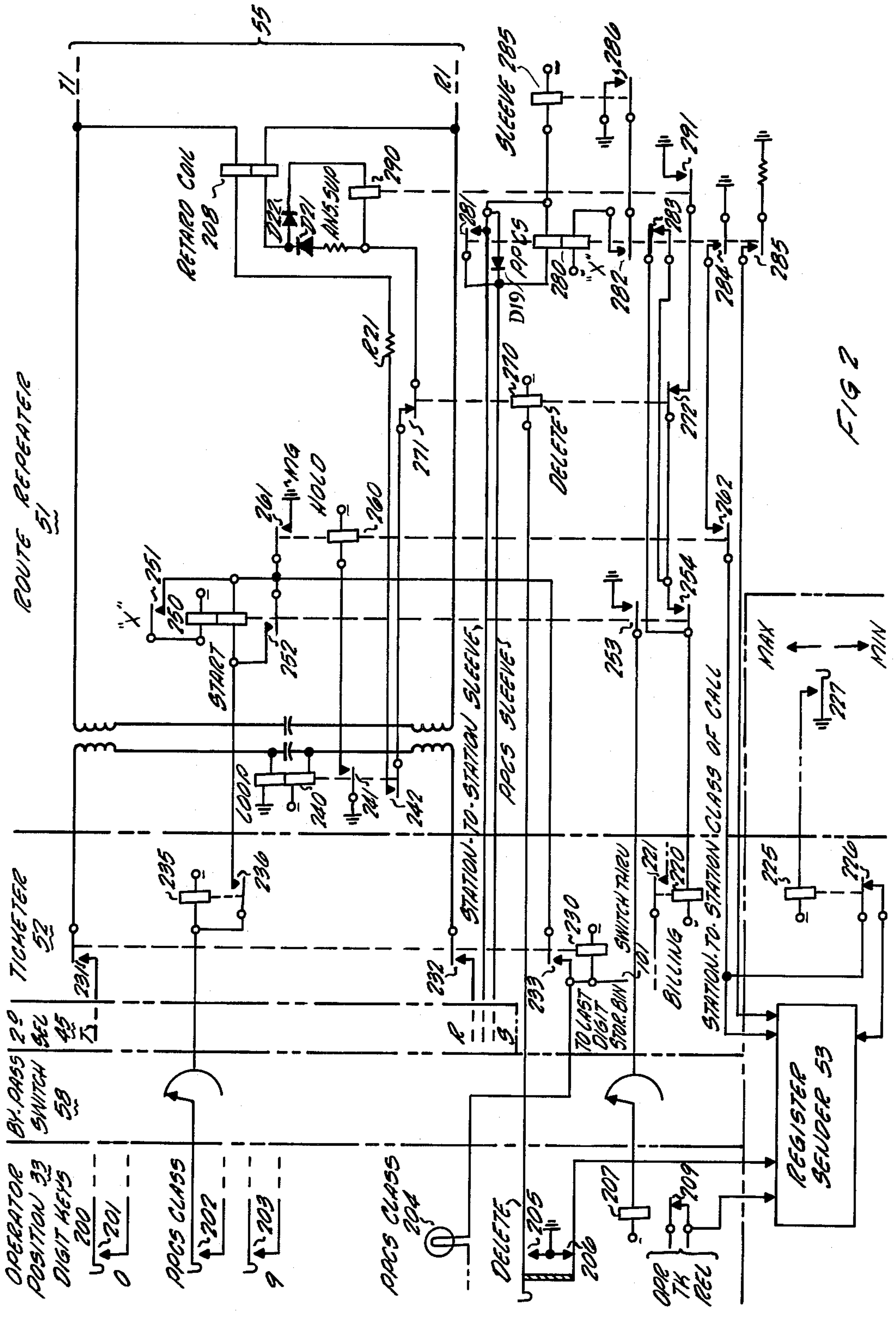

A more detailed explanation of the inventive toll ticketing system will next be given in conjunction with FIG. 2 which illustrates portions of the circuitry of the operator position 33, the ticketer 52, and route repeater 51.

Figure 1:
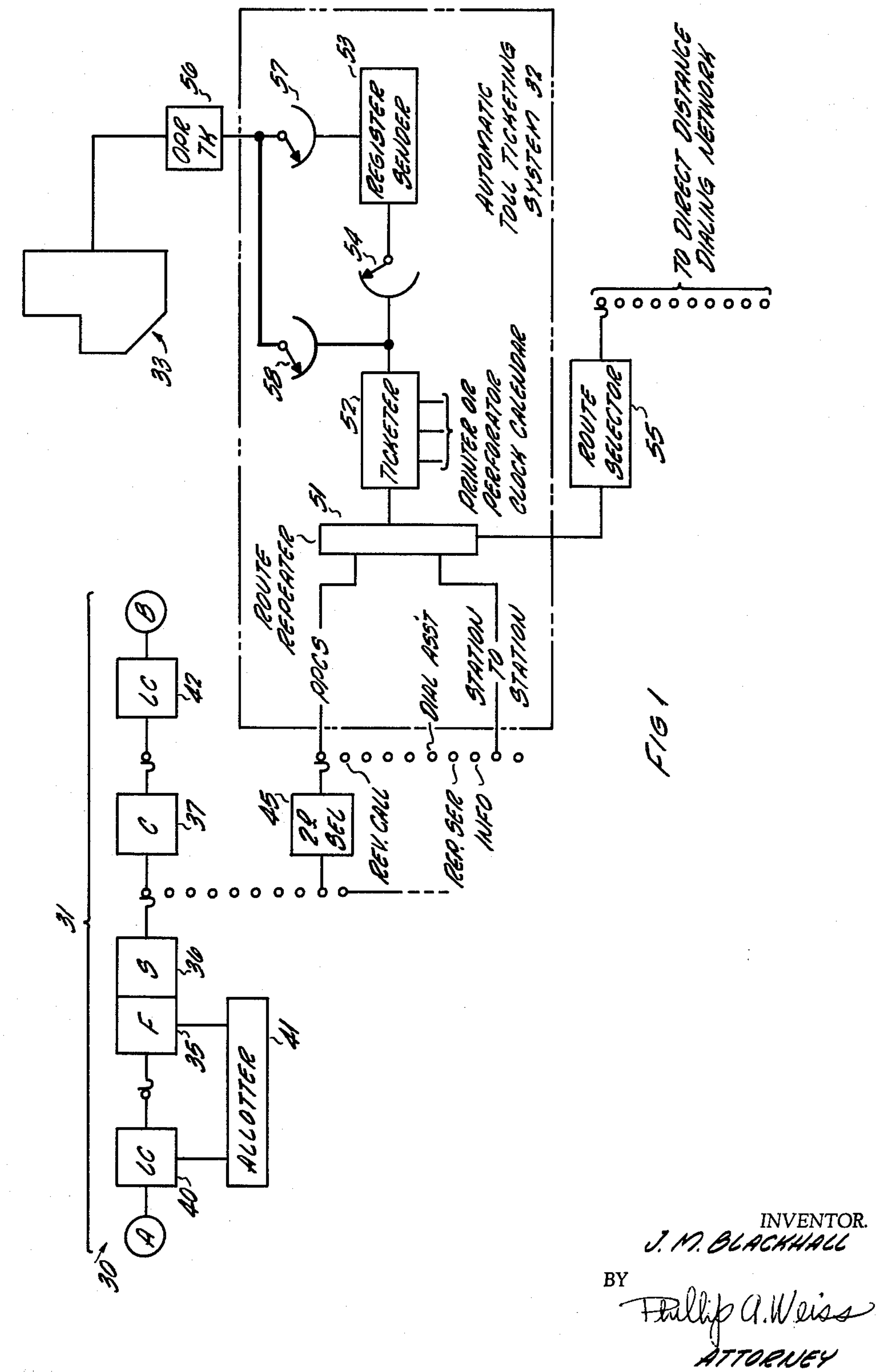

The operator's position 33 is shown at the far left hand side of the drawing, after it has been connected to the ticketer 52 through by-pass switch 58. The route repeater 51 is shown connected to the ticketer. Tip ring and sleeve leads of the second selector 45 are shown by dashed lines, leading into the ticketer 52. The dashed lines are used because, as can be seen in FIG. 1, these leads normally go through the route repeater 51 to the ticketer 52. Thus, FIG. 2 illustrates an automatic toll ticketing system for extending PPCS toll calls through a ticketer 52 responsive to the receipt of digits that cause the second selector 45 to seize a PPCS lead associated with route repeater 51. The route repeater 51 initiates a signal indicative of the PPCS toll call that actuates register-sender 53 to seize operator's position 33. The operator position is then connected to the ticketer 52 through switch 58 and the call is under the control of the operator.

*PPCS call*

Means are provided in the routing repeater 51 to indicate that PPCS call service is required. In greater detail, when the calling party has dialed the proper prefix or access digits to indicate a PPCS call, the second selector 45 is driven to a level having the PPCS terminal thereon. When an idle PPCS circuit is found, the selector 45 places a ground on the terminal of that circuit. Responsive to the ground on the PPCS terminal, the PPCS sleeve lead in FIG. 2 is grounded. The PPCS relay 280 and sleeve relay 285 operate in series responsive to the ground on the PPCS sleeve over a circuit that extends to the PPCS relay through the upper coil of relay 280 and through the coil of relay 285 to negative battery.

Responsive to the operation of relay 280, contacts 281–285 operate from their positions. Contacts 282 are marked with an "X" to indicate that they close before any other contacts controlled by relay 280 have time to operate. The closure of these contacts 282 extends a locking circuit from negative battery through the lower winding of relay 280, "X" contacts 282, and contacts 286 to ground, after sleeve relay 285 operates. Contacts 281 close to extend busy ground to the station-to-station sleeve over an obvious circuit. Contacts 281 also shunt the upper winding of relay 280; however, the timing is such that relay 280 has already locked at its "X" contacts before contacts 281 close.

Normally closed contacts 283 open to prevent the operation of the billing relay 220 (in the ticketer) when the answer supervision relay operates. In greater detail, the circuit extending from ground through contacts 291, 272, 283 and the coil of billing relay 220 to battery is inhibited.

Normally open contacts 284 close preparatory to an inhibiting of the normal station-to-station toll ticketing operations. The solid ground on contacts 284 is not immediately applied to the station-to-station class of call lead because contacts 262 are now open. However, as will become more apparent, later during the call, when contacts 262 do close, normal station-to-station operation occurs only if contacts 284 are open.

Means are provided for seizing an operator position and for completing a by-path around the register-sender during PPCS calls. In greater detail, normally open contacts 285 close to apply a resistance ground to the register-sender 53. This resistance ground causes any suitable circuit to drive the switches 57, 58 (FIG. 1) to extend both the direct connection and the by-path connection to the operator position.

While the PPCS relay 280 is being operated, the dialed digits are being stored and translated in the register-sender 53. At a convenient time, such as after the last storage bin of the register has stored a digit, ground is extended to lead 101. Responsive to this ground on lead 101, a PPCS lamp 204 lights on the operator's switchboard to indicate that this is a PPCS call. The lamp lights over the circuit that extends ground from the last storage bin of the register, over lead 101, through lamp 204 and equipment not shown to a battery at the seized operator position.

Also, responsive to the ground applied to the lead 101 from the last storage bin, switch through relay 230 operates over an obvious circuit. At the same time, the calling subscriber hears a signal, such as three zip tones and either the operator requests or the calling party automatically gives information, usually the name of the called party.

Responsive to the operation of relay 230, contacts 231 and 232 operate to close the loop extending from the second selector 45 to conductors T, R. Also, responsive to the operation of relay 230, contacts 233 close to prepare a locking path for maintaining relay 230 operated after the ground is removed from lead 101.

Responsive to the operation of contacts 231 and 232, loop relay 240 operates over a path that extends from negative battery on the lower winding of loop relay 240 through the lower winding of a repeat coil, contacts 232, ring lead R, the loop path to the calling subscriber station, and back around through tip lead T, contacts 231, and the upper winding of the repeat coil, to ground on the upper winding of relay 240.

Responsive to the operation of relay 240, contacts 241 close to extend an operating ground over an obvious circuit to slow-to-release hold relay 260. Also responsive to the operation of relay 240, contacts 242 close to complete a loop to outgoing equipment 55 over a circuit that extends from the tip lead T1, through the upper winding of retard coil 208, resistor R21, contacts 242, 271, diode D21, the lower winding of retard coil 208, and ring lead R1.

Responsive to the operation of relay 260, master ground is extended to the route repeater circuit through contacts 261. Relay 230 is locked operated through contacts 233 and 261.

At this time, loop relay 240 pulses responsive to the outpulsing of the register-sender 53. These pulses are transmitted over the outgoing loop circuit T1, R1 to equipment 55 responsive to the opening and closing of contacts 242 caused by the pulsing of loop relay 240. The equipment 55 responds in any suitable way to seize and signal the called subscriber station.

When the called party answers, battery reversal occurs. Responsive to such battery reversal, the answer supervision relay 290 operates over a circuit that extends from ground over ring lead R1, the lower winding of the retard coil, diode D22, the winding of relay 290, contacts 271, contacts 242, resistor R21, and the upper winding of retard coil 298 to negative battery on tip lead T1.

Responsive to the operation of answer supervision relay 290, contacts 291 close. This prepares a ground for the billing relay in the ticketer. However, the ground is not extended to the ticketer at this time because contacts 254 of start relay 250 remain in their normally open position.

Means are provided at the operator's position for initiating the billing. The operator challenges the called party, and if the called party answers the phone, or if the called party accepts a collect call, the operator keys a start timing number by closing a predetermined key 202 in her digit key set. Responsive to the operation of the PPCS class number digit key 202, relay 235 is operated from a ground extended through the key 202, by-pass switch 58 and the coil of relay 235 to battery.

Responsive to the operation of relay 235, contacts 236 close to extend master ground from contacts 261 through the lower winding of start relay 250, contacts 236, and the winding of relay 235 to battery. When the operator releases key 202, relay 250 will operate in series with relay 235. Also, relay 235 locks in series with the relay 250 lower winding. Responsive to the operation of relay 250, "X" contacts 251 close first to lock relay 250 to master ground at contacts 261, contacts 252 close to extend a locking ground to relay 235 over a circuit that extends from master ground through contacts 261, contacts 252, contacts 236 and the coil of relay 235 to battery.

The operation of start relay 250 also closes contacts 254 to complete the ground circuit from contacts 291, through contacts 272, 254 to billing relay 220 so that the ticketer can start its billing operation. In greater detail, contacts 221 close to connect appropriate equipment such as a clock-calendar to the ticketer.

At the same time, normally open contacts 253 close extending ground to relay 207 in the operator's position. This ground automatically operates relay 207 to open normally closed contacts 209 and disconnect the operator's trunk and the register-sender (on a maximum service system) from the call.

*Station-to-station call*

If the call is a station-to-station call, the prefix or access digit drives the second selector 45 to level 9 (as shown in the exemplary FIG. 1). Ground is extended over the station-to-station sleeve indicated in FIG. 2. This ground also busys the PPCS lead but does not operate the PPCS relay 280 because the ground is extended to the PPCS relay but diode D19 shunts the upper coil of the PPCS relay 280 preventing it from operating.

The station-to-station call differs from the above described PPCS call as follows: (1) the PPCS relay 280 does not operate, (2) contacts 285 do not close, thus, no ground is sent to operate the operator select switch 57 or the by-pass switch 58; (3) contacts 284 do not close to give the maximum-minimum service; and (4) contacts 283 remain closed so that the toll ticket billing starts when answer suppervision relay 290 operates contacts 291, the billing start circuit now including contacts 291, 272, 283, and the winding of billing relay 220.

*Maximum-minium service*

The invention provides means for giving the operating company, owning the system, an option as to whether maximum or minimum service shall be given. This is important because it affects the number of register-senders 53 that the operating company must purchase. Maximum PPCS provides at least the following features:

(1) Optional through supervision to point of origin for PBX's and operator out-dial trunks.
(2) CLR holding of the originating line.
(3) Arrangements for operators to delete and reenter calling and called numbers.
(4) Toll line release and resending of the terminating number dialed into the PPCS register by either subscriber or operator.
(5) Ring back to PBX lines.
(6) Delayed time start.
(7) Change of class any time before time start.
(8) Full ten-choice storage in ticketers of rate and class.

The invention contemplates one option whereby the operating company originally buys the amount of equipment required to give either grade of service. Here the equipment is permanently wired to give such grade of service. The invention also contemplates giving a selection of the grade of service. Here the system contains a switch 227 which operates to either a "Max" or a "Min" position, as required. One selection operation could be made under the control of subscriber line restrictive service equipment. Another selection could be made under control of a clock which reduces the grade of service during peak traffic hours. Yet another selection could be made under control of a wire chief to reduce the grade of service during periods of maintenance. Still other selection criteria will readily occur to those skilled in the art.

Briefly stated, maximum service holds the register-sender until the operator trunk is released by the operation of relay 207. This way, if the operator challenges a called party and learns that another number must be dialed to reach the desired party, she may delete the number originally stored in the register-sender by the calling party. Then she may dial a new number. This way she may make repeated attempts until the call is completed.

Minimum service, on the other hand, drops the register-sender 53 as soon as it completes outpulsing which is long before the operator trunk releases. Thus, the register-sender is free to serve another call and fewer register-senders are required. If the called party must be reached at another number, the operator can not dial a new number under minimum service because certain billing information is lost when the register-sender releases. Rather, the calling party must hang-up and place a new call to reach the other number.

During minimum service, the register-sender to operator path (switch 57) is dropped before the called party can answer. Thus, a by-pass operator-ticketer connection is provided to substitute for the register-sender to operator connection after the register-sender releases. This by-pass is established by means of an automatic multi-point switch 58 connected in bank multiple with the ticketer-register switch 54 and in wiper multiple with the operator number identification switch 57. The by-pass switch carries the necessary wires to permit control, talking, listening and delayed start of time. This arrangement provides minimum service PPCS and, therefore, requires a minimum number of register-senders. On the other hand, maximum PPCS is also easily provided through the use of a sufficient number of register-senders.

In greater detail, during maximum service the operation of delete switch 205 by the operator releases the outgoing equipment by operating relay 270 over an obvious circuit. Responsive to the operation of relay 270, contacts 271 open to break the outgoing loop to equipment 55 and contacts 272 open to remove the ground to the billing relay for precluding any premature billing operation. Also, by the operation of switch 206 ground is removed from the called number storage bins in the register-sender 53, thus releasing the numbers stored thereon. After release of key 205, 206, the operator uses keys 200 to dial a new number. Thereafter, the PPCS circuit functions as before and a new connection is completed under control of the new number.

The choice of minimum or maximum service is easily accomplished merely by operating switch 227 to apply or remove a ground from relay 225 and cause contacts 226 to operate or to return to their normal closed position. If contacts 227 are open, relay 225 does not operate; contacts 226 are closed. When the register has stored its last digit, conductor 101 is grounded, and relays 220, 235, 260 operate in the described manner. If this is a PPCS call, contacts 284 are closed. Thus, a ground signal is sent via contacts 284, 262, 226 to register-sender 53 which releases responsive to the ground after it outpulses its last digit. If contacts 227 are closed, relay 225 operates, and contacts 226 open. Thus, the ground on contacts 285 can not reach the register-sender 53. Instead, the register-sender release is under control of contacts 209.

While the principles of the invention have been described in connection with specific apparatus and applications, it is to be understood that this description is made only by way of example and not as a limitation on the scope of the invention.

What is claimed is:

1. An automatic toll ticketing system comprising means for extending person-to-person, collect, and special service toll calls through automatic toll ticketing equipment responsive to the receipt of certain digital information, said equipment comprising a ticketer and an associated regster-sender, means responsive to said certain digital information for connecting an operator's trunk to said register-sender, and means for automatically connecting said operator's trunk directly to said ticketer to by-pass said register.

2. An automatic toll ticketing system comprising means for extending person-to-person, collect, and special service toll calls through automatic toll ticketing equipment responsive to the receipt of certain digital information, said equipment comprising a ticketer for automatically billing sad person-to-person, collect, and special service toll calls, a register-sender associated with said ticketer for storing translating and outpulsing digital information to establish said calls, means responsive to said certain digital information for connecting an operator's trunk to said register-sender, means for automatically connecting said operator's trunk directly to said ticketer to by-pass said register-sender and means for automatically dropping said register-sender after outpulsing.

3. An automatic toll ticketing system comprising means for extending toll calls through automatic toll ticketing equipment responsive to the receipt of certain digital information, said equipment including a route repeater for distinguishing a person-to-person, collect, and special service call from a station-to-station call, means in said repeater operated responsive to a person-to-person, collect, and special service call for extending a person-to-person, collect, and special service indicating signal, ticketer means, connected to said repeater for billing said calls, register-sender means for storing, translating and outpulsing digital information to establish said call, switch means connecting said register means to said ticketer prior to the receipt of said digital information, said register-sender operated responsive to said person-to-person, collect, and special service indicating signal to seize an idle operator's trunk, means for automatically connecting said trunk directly to said ticketer to by-pass said register-sender means, operator's position for indicating a person-to-person, collect, and special service call, and means responsive to the operator's control for initiating billing.

4. An automatic toll ticketing system comprising means for extending person-to-person, collect, and special service toll calls through automatic toll ticketing equipment responsive to the receipt of certain digital information, said equipment comprising a ticketer for billing said toll calls, register-sender means for storing, translating and outpulsing said digital information to establish said toll calls, first switch means for connecting said ticketer to said register-sender prior to receiving said digital information, route-repeater means, means in said route repeater means for distinguishing a person-to-person, collect, and special service call from a station-to-statoin call, means in said repeater operated responsive to said person-to-person, collect, and special service calls for extending a person-to-person, collect, and special service indicating signal, means in said register-sender operated responsive to said person-to-person, collect, and special service indicating signal to seize an idle operator's trunk, second switch means operated to line up with said first switch means to connect said operator's trunk directly to said ticketer by-passing said register-sender means and means for automatically dropping said register after outpulsing.

5. An automatic toll ticketing system comprising means for extending person-to-person, collect, and special service toll calls through automatic toll ticketing equipment responsive to receiving certain digital information, said equipment comprising a ticketer and an associated register-sender, means responsive to said certain digital information for connecting an operator's trunk to said register-sender, means for connecting said operator's trunk directly to said ticketer to by-pass said register-sender, means for automatically dropping said register-sender while said operator's trunk is retained connected to said ticketer, and means for precluding said automatic dropping of said register-sender, and thereby keeping said register-sender in said circuit as long as said operator's trunk remains in said circuit.

6. An automatic toll ticketing system comprising means for extending toll calls through automatic toll ticketing equipment responsive to receiving certain digital information, said equipment including a route repeater, means in said route repeater for distinguishing a person-to-person, collect, and special service call from a station-to-station call, means responsive to said person-to-person, collect, and special service call for extending a person-to-person, collect, and special service indicating signal, ticketing means connected to said repeater for billing said call, means in said repeater for initiating billing as soon as a station-to-station call is switched through and for preventing the initiation of billing in a person-to-person, collect, and special service call when said person-to-person, collect, and special service call is switched through, register-sender means for storing, translating and outpulsing digital information required to establish said calls, said register-sender operated responsive to said person-to-person, collect, and special service indicating signal to seize an idle operator's trunk, means for automatically connecting said trunk directly to said ticketer by-passing said register-sender means, an operator's position connected to said trunk, means at said operator's position for indicating a person-to-person, collect, and special service call, and means at said operator's position for initiating billing.

7. An automatic toll ticketing system comprising means for extending toll calls through automatic toll ticketing equipment responsive to receiving certain digital information, said equipment including a route repeater, means in said route repeater for distinguishing a person-to-person, collect, and special service call from a station-to-station call, means in said repeater operated responsive to a person-to-person, collect, and special service call for extending a person-to-person, collect, and special service indicating signal, ticketer means connected to said repeater for billing said calls, register-sender means for storing translating and outpusing digital information required to establish said calls, switch means connecting said register-sender means to said ticketer prior to the receipt of said digital information, said register-sender operated responsive to said person-to-person, collect, and special service indicating signal to seize an idle operator's trunk, means for connecting said trunk directly to said ticketer to by-pass said register-sender means, means for automatically dropping said register-sender after it completes outpulsing, means for disenabling said automatic dropping means, an operator's position connected to said operator's trunk, means at said operator's position for deleting the information stored in said register and for keying in new digital information, means for releasing said operator's trunk and means for dropping said register-sender when said operator's trunk releases.

8. An automatic toll ticketing system comprising means for extending person-to-person, collect, and special service toll calls through automatic toll ticketing equipment responsive to the receipt of certain digital information said equipment comprising ticketer means for billing said toll calls, register-sender means associated with said ticketer means for storing and outpulsing said digital information, means responsive to certain digital information for connecting an operator's trunk to said register-sender, means for automatically connecting said operator's trunk to said ticketer by-passing said register-sender, operator's position connected to said operator's trunk, means for automatically dropping said register immediately after outpulsing, means for disenabling said automatic dropping means, and means at said operator's position for deleting digital information stored in said register-sender and inserting new digital information therein.

9. An automatic toll ticketing system for extending toll calls through automatic toll ticketing equipment, comprising switch train means for connecting subscriber stations to outgoing circuits, special selector means, means responsive to certain digital information for connecting said switch train means to said special selector, automatic toll ticketing equipment comprising repeater means having a person-to-person, collect, and special service terminal, means for driving said special selector to seize said repeater through said person-to-person, collect, and special service terminal, means in said repeater for extending a person-to-person, collect, and special service signal responsive to seizure of said person-to-person, collect, and special service terminal, ticketer means for automatically billing said toll calls connected to said repeater, register means for storing and outpulsing digital information to extend said toll calls, associated with said ticketer prior to the receipt of said digital information, means in said register for seizing an idle operator's trunk responsive to said person-to-person, collect, and special service signal from said repeater, means for connecting said operator's trunk to said tricketer by-passing said register means, an operator's position connected to said operator's trunk and means for dropping said register after outpulsing.

No references cited.

KATHLEEN H. CLAFFY, *Primary Examiner.*

H. ZELLER, *Assistant Examiner.*